United States Patent
Damm et al.

(10) Patent No.: US 7,992,613 B2
(45) Date of Patent: Aug. 9, 2011

(54) METHOD AND ARRANGEMENT FOR THE PRODUCTION OF COMPOSITE WORK PIECES COMPRISING LAYERS LAMINATED TO EACH OTHER

(75) Inventors: Norbert Damm, Karlsdorf-Neuthard (DE); Gerhard Dolker, Baiersbronn (DE); Michael Pojtinger, Baiersbronn (DE); Wolfgang Renz, Freudenstadt (DE); Matthias Zufle, Baiersbronn (DE)

(73) Assignee: Robert Burkle GmbH, Freudenstadt (DE)

( * ) Notice: Subject to any disclaimer, the term of this patent is extended or adjusted under 35 U.S.C. 154(b) by 114 days.

(21) Appl. No.: 12/502,282

(22) Filed: Jul. 14, 2009

(65) Prior Publication Data
US 2010/0012258 A1    Jan. 21, 2010

(30) Foreign Application Priority Data
Jul. 17, 2008 (DE) .......................... 102008033631.9

(51) Int. Cl.
*B32B 41/00* (2006.01)

(52) U.S. Cl. ........ 156/358; 156/367; 156/368; 156/378; 156/379

(58) Field of Classification Search ................. 156/358, 156/367, 368, 378, 379, 64, 99, 103, 104
See application file for complete search history.

(56) References Cited

U.S. PATENT DOCUMENTS
| | | | |
|---|---|---|---|
| 4,696,713 A | * | 9/1987 | Okafuji et al. ............... 156/358 |
| 2009/0050270 A1 | * | 2/2009 | Bagley et al. ............ 156/345.24 |

FOREIGN PATENT DOCUMENTS
| | | |
|---|---|---|
| DE | 3501631 | 7/1986 |
| DE | 19903171 | 8/2000 |
| WO | 03057478 | 7/2003 |
| WO | 2006033994 | 3/2006 |
| WO | 2006128699 | 12/2006 |
| WO | 2008048464 | 4/2008 |

* cited by examiner

*Primary Examiner* — George R Koch, III
(74) *Attorney, Agent, or Firm* — Volpe And Koenig, P.C.

(57) ABSTRACT

A method and an arrangement for the production of composite work pieces of layers laminated to each other, with at least one layer representing a glass plate. First, at least one composite work piece is laminated in a lamination press under the effects of pressure and heat in order to at least activate the adhesive material used for lamination. Then the composite work piece is removed from the lamination press and transported into a curing station and/or cooling station for curing and/or cooling. A testing device for detecting broken glass in the composite work piece is arranged between the lamination press and the curing station or between the lamination press and the cooling station, which detects potentially present broken glass by testing the inherent stability of the composite work piece.

13 Claims, 2 Drawing Sheets

METHOD AND ARRANGEMENT FOR THE PRODUCTION OF COMPOSITE WORK PIECES COMPRISING LAYERS LAMINATED TO EACH OTHER

CROSS-REFERENCE TO RELATED APPLICATIONS

This application claims the benefit of German Patent Application No. DE 10 2008 033 631.9, filed Jul. 17, 2008, which is incorporated herein by reference as if fully set forth.

BACKGROUND

The invention relates to a method and an arrangement for the production of composite work pieces comprising layers laminated to each other, with at least one of the layers being a glass plate.

The primary application of the present invention is the lamination of photo-voltaic modules, in which a planar arrangement of solar cells is covered by a glass plate at the front and is encapsulated by a rear film or in a similarly weather-proof and primarily moisture-tight fashion. Furthermore, at least one adhesive layer with a thermally reactive adhesive material is included, which is activated by the effects of heat.

An arrangement of the present type comprises a lamination press for laminating the composite work pieces under the effects of pressure and heat as well as at least one curing station positioned downstream in reference to the lamination press and/or at least one cooling station for curing and/or cooling the composite work pieces. Both, the curing station, if provided, as well as the cooling station are usually embodied as presses with heating and/or cooling plates.

One example for a lamination press that can be used in a method and an arrangement of the present type is known from WO 2006/128699 A2. Here, above a heating plate an upper part, which can be moved upwards and downwards, is arranged with a sealing frame, which circumscribes a vacuum chamber. When closing the press, the upper part moves onto the heating plate and the sealing frame is placed onto the heating plate in a sealing fashion such that the vacuum chamber can be evacuated. A flexible membrane is stretched over the sealing frame, sealing the vacuum chamber and serving as a compression member in order to apply the pressure against the heating plate necessary for the lamination of the work piece arranged on the heating plate. For this purpose, when the press is closed, the volume located underneath the membrane and between said membrane and the heating plate is evacuated such that the membrane tightly contacts the work piece.

Therefore, due to the evacuation of the volume positioned underneath, the membrane applies the necessary pressure for the lamination process onto the work piece, while simultaneously the evacuation of the work piece environment ensures that during the heating of the work piece no bubbles form therein or that they can be extracted. Accordingly, the lamination process can be performed entirely inside the lamination press so that subsequently only a cooling station must be passed; however it is also possible to perform the lamination process under a vacuum in the lamination press only until the adhesive material in the adhesive layer has been activated, then to open the lamination press and to further treat the work piece thermally in a subsequent curing station under normal pressure.

When now photo-voltaic modules or other composite work pieces with glass plates are laminated in a lamination press with a compression member it frequently happens that the glass plate (or at least one of several glass plates) breaks. Although the shards of the broken glass plate, due to the lamination process, still contact the adhesive layer with its activated adhesive material it is still not only possible but actually occurs regularly that shards or chips fall off and cause major problems in the subsequent processing steps, thus particularly in the curing station and/or the cooling station, damaging in particular additional composite work pieces during the curing and/or cooling process.

SUMMARY

Starting from this prior art, the present invention is based on the object of providing a method and an arrangement of the type mentioned at the outset, which react appropriately when glass breaks during the lamination process in order to reduce the risk of consequential damages.

This object is attained in an arrangement having the features of the invention as well as a method according to the invention. Preferred embodiments of the arrangement according to the invention are described below and in the claims; advantageous further developments of the method according to the invention are also described below.

According to the present invention, a testing device for detecting broken glass in the composite work piece is arranged between the lamination press and the curing station or, if a curing station is not provided, between the lamination press and the cooling station, which preferably causes the composite work piece to bend and detects it. The invention therefore uses the fact that a broken glass plate shows lower inherent stability than a sound glass plate, which in turn affects the inherent stability of the entire composite work piece. When now particularly a bending of the composite work piece is caused, for example by lifting the work piece at its ends or in its center or by any other way impinging the work piece with a force in a non-planar fashion, this bending will be the stronger the lower the inherent stability of the composite work piece. A composite work piece with a sound glass plate will show a significantly higher inherent stability and thus a significantly lower degree of bending than a composite work piece with one or even more broken glass plates.

According to the invention the test of the composite work pieces for broken glass occurs by way of detecting the inherent stability of the composite work pieces in the area of the outlet of the lamination press, i.e. in the traveling path between the lamination press and the subsequent processing station, and therefore at a location where falling glass chips or shards cannot cause any serious damage. This is particularly important when the lamination press and the subsequent processing stations are each embodied in several tiers in order to maintain an area capacity as high as possible during the production of particularly photo-voltaic modules. Because if in one of the upper tiers a glass plate breaks glass chips or shards can enter the subsequent processing stations in a multitude of press tiers and thus cause damages increased by a multiple.

Preferably the composite work piece is bent for the purpose of detecting broken glass such that the glass plate is stretched during the bending. It should therefore be arranged at a convex side of the bent work piece and in any case at the exterior of the neutral fiber in the bent composite work piece. Because when the glass plate is positioned on the concave side of said neutral fiber it would be compressed during bending. In most types of glass breaks, the shards are still contacting each other in a planar fashion so that they still show some compression resistance by no more tensile strength. During the bending of the composite work piece, the glass plate should therefore be located at the side subjected to tensile stress and not at the side subjected to pressure.

In a photo-voltaic module with only one glass plate as a cover layer this is embodied so that the module is bent such that the glass plate essentially bends convexly.

Here it must be mentioned that the bending of the composite work piece for the purpose of detecting broken glass not necessarily occurs convexly and/or concavely in the sense of the word; rather different, irregular bending as well as two-dimensional, i.e. essentially cylindrical bending is also possible and included in the scope of the present invention.

Preferably, a detection device is also provided which detects the bending of the composite work piece optically, for example via a camera or a laser measuring device, or mechanically, for example by a measurement of flexural strength. The measurements taken by said detection device can then be processed and used to detect broken glass.

Bending the composite work piece can particularly be caused by a sensor roll, which can be lifted upwards, or a similar sensor glider, which lift and/or attempt to lift the composite work piece transported past them, preferably in the area of its lateral edge. Because when the lifting of the sensor roll or the sensor glider occurs with a force considerably lower than the weight of the composite work piece the sensor roll and/or the sensor glider can only be lifted upwards if the composite work piece can easily be bent. This is only the case, though, if the glass is broken. When the composite work piece comprises sound glass plates, the bending is of such minor extent that the weight of the composite work piece prevents any lifting of the sensor roll or the sensor glider. Only when broken glass is present the sensor roll and/or the sensor glider can locally lift the composite work piece. When the sensor roll and/or the sensor glider are therefore provided with a detection device detecting a lifting in spite of a composite work piece resting thereupon a composite work piece with broken glass can be reliably detected in this manner.

Beneficially, the testing device according to the invention detecting broken glass via the inherent stability of the composite work piece is coupled with a removal device, which removes composite work pieces with identified broken glass at this point from the processing line. This way stopping the arrangement due to broken glass can be prevented.

When such a removal device is provided it is advantageous that it reports such a removal process to a system control so that here the gap that has developed can be considered during the further processing of the composite work pieces in the processing line. This is particularly necessary when several composite work pieces each are laminated simultaneously in the lamination press, transported together into the further processing stations, and are here further processed together, because due to the brittleness of the composite work pieces provided with glass plates they usually must be centrally aligned in the presses used.

BRIEF DESCRIPTION OF THE DRAWINGS

In the following, an exemplary embodiment for an arrangement according to the invention is described and explained in greater detail using the attached drawings. Shown are.

DETAILED DESCRIPTION OF THE PREFERRED EMBODIMENTS

Figure 1:
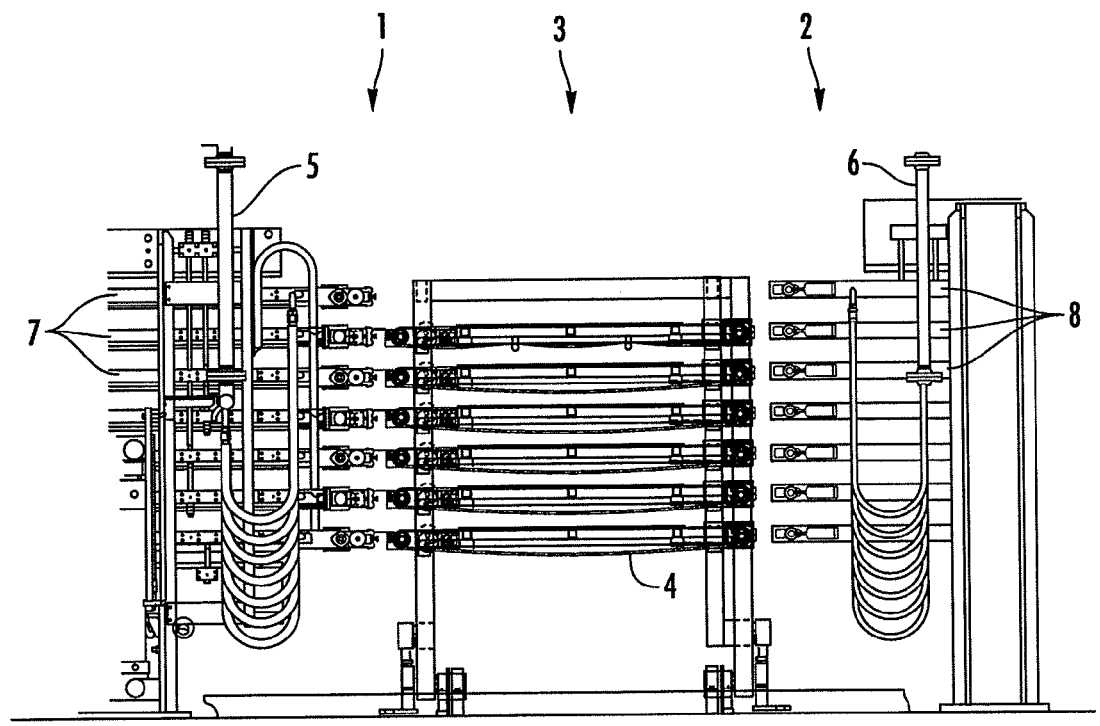
FIG. 1 is a schematic side view of an exemplary embodiment of an arrangement according to the invention.

The arrangement shown in FIG. 1 comprises a lamination press 1 with six tiers, a cooling station 2 embodied as a multi-tiered press, and a transportation device 3 for transferring composite work pieces that have been laminated in the lamination press 1 into the cooling station 2. Both, the lamination press 1 as well as the cooling station 2 and the transportation device 3, comprise six tiers and an appropriate number of circulating conveyer belts 4. The lamination press 1 is provided with a heating device 5 to supply the individual press tiers with hot thermo-oil, while the cooling station 2 comprises a cooling device 6 for introducing refrigerants into the individual press tiers. Both the lamination press 1 as well as the cooling station 2 comprise seven heating plates 7 and/or cooling plates 8 each, which can be moved towards each other for the purpose of lamination and/or cooling in order to close the individual press tiers. The transportation device 3 is embodied in a non-closing fashion because it only serves the task of transferring the composite work pieces from the lamination press 1 into the cooling station 2 but not to compress the composite work pieces.

Figure 2:
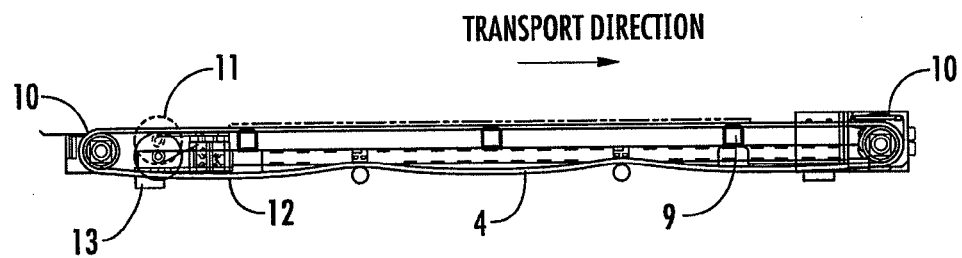
FIG. 2 is a detail taken from FIG. 1.

FIG. 2 shows in detail one tier of the transportation device 3, for example the uppermost one. The conveyer belt 4 traveling around a frame 9 and two deflection rolls 10 is embodied narrower than the composite work pieces to be transported thereupon. Laterally next to the conveyer belt 4, in the present illustration therefore visible behind the conveyer belt 4, a sensor roll 11 is arranged, which can be lifted by a predetermined force acting upwards, indicated in dot-dash lines. A detection device 12 detects the lifting of the sensor roll 11 caused by a pneumatic cylinder 13. The sensor roll 11 is activated each time a composite work piece resting on the conveyer belt 4 is transported over it, causing the sensor roll 11 to attempt locally lifting the composite work piece. When the glass plate of the composite work piece is sound, the composite work piece shows such a high inherent stability that a large portion of the weight of the composite work piece acts upon the sensor roll 11 and prevents that it is lifted. If the glass is broken, though, the inherent stability of the composite work piece is considerably lower allowing the sensor roll 11 to cause bending of the composite work piece to a greater extent so that the sensor roll 11 moves upwards and locally lifts the composite work piece. The detection device 12 recognizes that the sensor roll 11 has moved upwards and reports the presence of broken glass.

Figure 3:
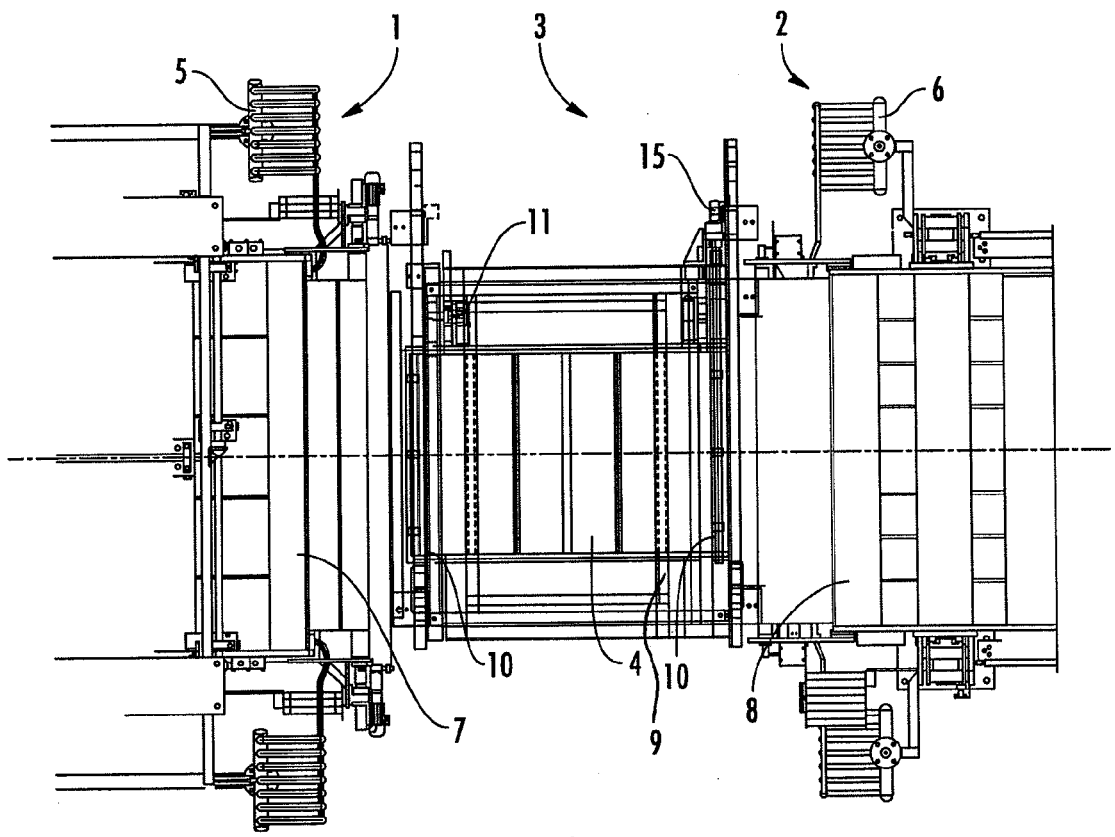
FIG. 3 is a top view of an arrangement of FIG. 1.

FIG. 3 shows the arrangement depicted in FIG. 1 in a top view, so that in this top view again the uppermost tier of the transportation device 3 is seen, as shown in FIG. 2. Here it is discernible that the conveyer belt 4 is embodied narrower than the heating plates 7 and/or cooling plates 8 of the lamination press 1 and/or the cooling station 2. The conveyer belt 4 is also narrower than the composite work pieces, not shown, processed in the lamination press 1 and the cooling station 2, so that they project right and left beyond the conveyer belt 4. Directly after leaving the lamination press 1, seen in the traveling direction left next to the conveyer belt 4, the sensor roll 11 is arranged such that it acts upon the composite work piece traveling over it close to the edge and attempts to lift it in a non-planar fashion, namely at the edge. As already mentioned the sensor roll 11 is lifted only with a force considerably lower than the weight of the composite work piece so that it cannot be lifted if the glass plate located therein is of a sound structure and shows a corresponding inherent stability.

Figure 4:
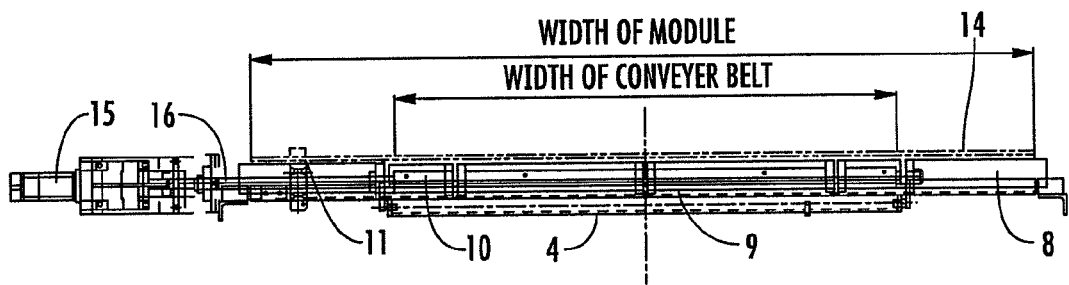
FIG. 4 is a front view of the detail of FIG. 2.

FIG. 4 shows once more the uppermost tier of the transportation device 3 in detail, however here in a front view, thus seen from the lamination press 1. Here it is discernible that the frame 9 with the circulating conveyer belt 4 is embodied narrower than a composite work piece 14 resting thereupon as well as the cooling plate 8 of the cooling station 2 arranged behind the transportation device 3 and still visible here. Accordingly, a motor 15 for driving the conveyer belt 4 is connected to the deflection roll 10 via an extended drive shaft 16.

It is easily discernible in FIG. 4 that the sensor roll 11 is arranged clearly off-set in reference to the conveyer belt 4 and only affects the edge region of the composite work piece 14. For the rest, in the present exemplary embodiment the composite work piece 14 comprises a glass plate, a layer of solar cells, and a rear film laminated thereto, with the glass plate being arranged at the bottom in the lamination press 1, and therefore also in the transportation device 3 and the cooling station 2. The sensor roll 11 therefore causes the composite work piece 14 to bend with the glass plate being stretched and not compressed. When the glass plate is sound the bending will remain of such a minor extent that the sensor roll 11 very quickly presses against a large portion of the weight of the composite work piece 14 so that according to the invention the lifting force acting upon the sensor roll is insufficient to displace the sensor roll 11 into its upper position. Only when the glass plate is broken the composite work piece 14 can be bent so easily that the sensor roll 11 can be lifted to the full extent without lifting a major portion of the composite work piece 14 as well; because it can bend easily due to the broken glass plate.

Finally, it should be mentioned that the inventive principle to determine broken glass by way of testing the inherent stability of the composite work piece is independent from the concrete application of this principle and is particularly independent of the location where said testing of the inherent stability occurs, and if the device applying the inventive principle also comprises a curing station and/or a cooling station in addition to a lamination press.

The invention claimed is:

1. An arrangement for producing composite work pieces having layers laminated to each other, with at least one layer representing a glass plate, comprising at least one lamination press (1) for lamination of the composite work pieces (14) under effects of pressure and heat as well as at least one of a curing station or at least one cooling station (2), arranged downstream in reference to the lamination press (1), for at least one of curing or cooling the composite work pieces (14);

a transportation device (3) being provided for transferring the composite work pieces (14) from the lamination press (1) to the at least one of the curing station or the at least one cooling station (2);

a testing device (11, 12) for detecting broken glass in the composite work piece (14) is arranged between the lamination press (1) and the curing station or between the lamination press (1) and the cooling station (2).

2. The arrangement according to claim 1, wherein the testing device (11, 12) is adapted to cause and detect any bending of the composite work piece (14).

3. The arrangement according to claim 2, wherein the testing device (11, 12) comprises a force applicator that is adapted to act essentially centrally upon the composite work piece (14).

4. The arrangement according to claim 2, wherein the testing device (11, 12) comprises a non-planar lifting device for the composite work piece (14).

5. The arrangement according to claim 4, wherein the testing device comprises at least one sensor roll (11) or one sensor glider that is arranged to lift upwards with a predetermined force.

6. The arrangement according to claim 5, wherein the sensor roll (11) or the sensor glider is acted upon with a force acting upwards, which is smaller than a weight of the composite work piece (14), and a detection device (12) is provided that determines when the sensor roll (11) or the sensor glider moves upwards and generates a corresponding signal.

7. The arrangement according to claim 2, wherein the testing device (11, 12) is arranged to cause the composite work piece (14) to bend such that the glass plate is stretched when bent.

8. The arrangement according to claim 2, wherein the testing device (11, 12) is provided with an optic detection device for detecting bending of the composite work piece (14).

9. The arrangement according to claim 8, wherein the optic detection device comprises a camera or a laser measuring device.

10. The arrangement according to claim 2, wherein the testing device (11, 12) comprises a mechanical detection device for detecting bending of the composite work piece (14).

11. The arrangement according to claim 1, wherein the testing device (11, 12) is coupled with a removal device for removing composite work pieces (14) when broken glass has been detected.

12. The arrangement according to claim 11, wherein at least one of the testing device (11, 12) or the removal device are connected to a system control for reporting any removal process thereto.

13. The arrangement according to claim 1, wherein the lamination press (1) and the at least one of the curing device or the cooling station (2) are multi-tiered.

* * * * *